United States Patent [19]

Richter et al.

[11] 3,862,559
[45] Jan. 28, 1975

[54] METHOD AND DEVICE FOR MAKING CONVEYOR BELTS

[75] Inventors: Heinz Richter, Ahlem; Walter Käse; Hans-Hermann Kölle, both of Hannover; Johann Rothen, Rossing, all of Germany

[73] Assignee: Continental Gummi-Werke Aktiengesellschaft, Hannover, Germany

[22] Filed: Feb. 13, 1973

[21] Appl. No.: 332,159

[30] Foreign Application Priority Data
Feb. 14, 1972 Germany.............................. 2206831

[52] U.S. Cl. ................................................. 72/205
[51] Int. Cl. .............................................. B21b 39/08
[58] Field of Search....................... 72/183, 205, 249

[56] References Cited
UNITED STATES PATENTS
2,432,828  12/1947  Stone..................................... 72/160
3,559,431  2/1971  Noe et al. ................................. 72/8
3,626,737  12/1971  Defontenay............................ 72/205
3,766,767  10/1973  Rastelli .................................. 72/249

*Primary Examiner*—Milton S. Mehr
*Attorney, Agent, or Firm*—Walter Becker

[57] ABSTRACT

A method of and device for making a conveyor belt according to which the conveying movement of reinforcing inserts for the belt to be made from a first station forming the inlet station to a second station forming the outlet station is effected by friction rollers arranged at the first and second stations respectively. There is exerting of pull stresses upon the reinforcing inserts during their movement from the first to the second station. The friction rollers at the first station are subjected to a torque acting in a sense opposite to the direction of the pull stresses exerted upon the reinforcing inserts while moving from the first to the second station.

1 Claim, 1 Drawing Figure

PATENTED JAN 28 1975  3,862,559
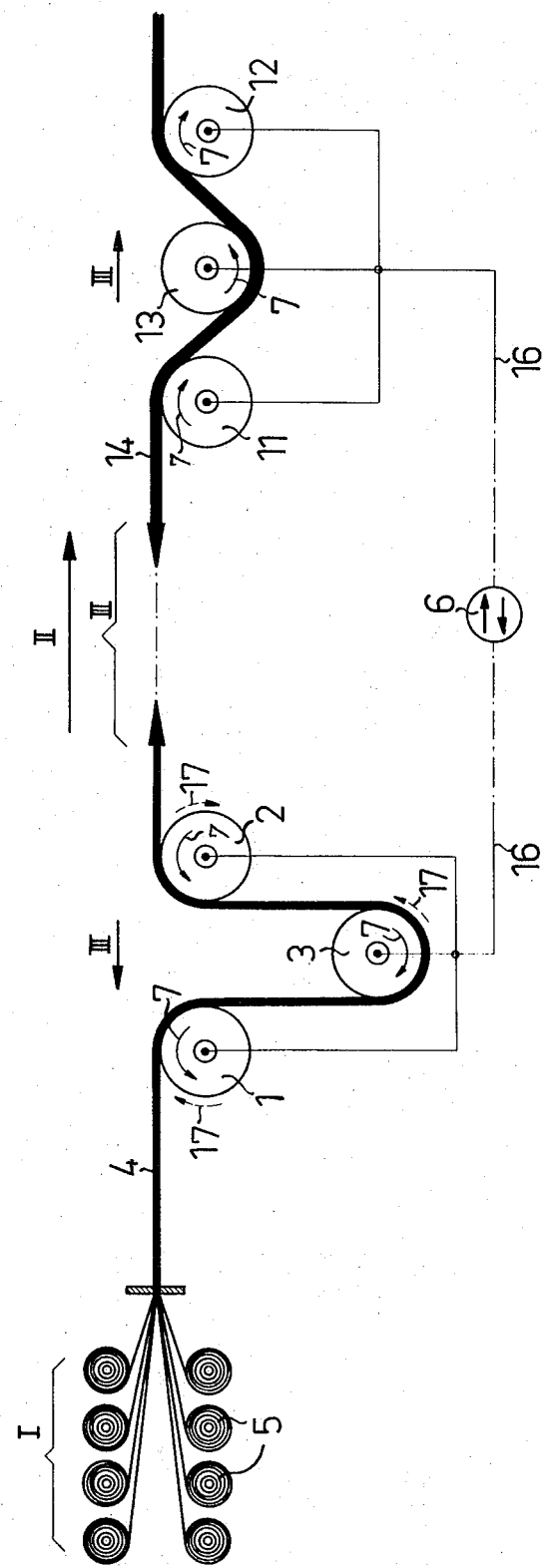

METHOD AND DEVICE FOR MAKING CONVEYOR BELTS

The present invention relates to a method of manufacturing conveyor belts with wire or cable reinforcing inserts which extend in the longitudinal direction of the conveyor belt. Subject to being arranged between friction rollers at least in pairs and adapted to be driven synchronously, these inserts are placed under pulling tension within the inlet and exit range of the manufacturing device. The inserts in tensioned condition are conveyed through this device.

For manufacturing high grade conveyor belts, the equalization of the originally always existing differences in length of the reinforcing inserts is an absolute necessity because otherwise differences in tension in different sections of the width of the conveyor belt will result in an undesired bending or curving of the belt and in a faulty behavior of the belt. This applies basically to all conveyor belts as far as the embedded reinforcing inserts extend in an endless manner over the entire length of the belt. This applies in particular to so-called steel cable conveyor belts which as strength carriers comprise steel cables, wires or other kinds of cables; such cables are oriented exclusively in the longitudinal direction of the conveyor and, while being arranged parallel to each other, do not contact each other. In such an instance the individual wires, cables or the like are lengthened individually by means of additional separate tensioning devices. Thus the total tension generated by the friction rollers in a uniform or approximately uniform distribution can be applied to all cables or the like over the width of the belt. In heretofore known manufacturing devices with tensioning fields defined by friction rollers or similarly acting clamping devices, this principle has been realized successfully. It has been found, however, that the ideal condition, namely that the tensions in the reinforcing inserts are uniform and remain uniform, can be maintained only when the respective tensioned section is at a standstill; however with the begin of the feeding-in movement the conditions change and unpredictable variations in the set tension values occur.

It is, therefore, an object of the present invention to maintain constant the tension of the reinforcing inserts independently of their condition of movement and to eliminate interfering influences by additional forces on the desired uniform distribution of the tensions.

This object and other objects and advantages of the invention will appear more clearly from the following specification in connection with the accompanying drawing diagrammatically illustrating a device for manufacturing so-called steel cable conveyor belts.

According to the method of the present invention, it is provided that the feed-in movement of the reinforcing inserts is brought about by subjecting the friction rollers in the inlet range of the manufacturing device to a torque which is directed counter to the pulling tension. To this end, the friction rollers must be adapted in the inlet range to be driven with a torque which acts in a direction opposite to the driving direction for the friction rollers in the exit range. The difference of the applied torques is expediently equalling approximately the total of the resistances encountered by the reinforcing inserts during their feeding movement. When practicing the invention, the drive of the friction rollers in the inlet range may be subjected to the influence of an additional working medium which acts counter to the torque which generates the pulling tension. In case of hydraulic drive motors, the working pressure is acted upon in opposite direction, or in case of an electric drive, depending on the motor characteristic, the voltage or the current intake is reduced. Selectively, however, it is also possible to provide the friction rollers at the inlet region with an additional drive motor which in case of need can be utilized.

The invention has solved the problem involved by properly recognizing the forces which act upon the preloaded reinforcing inserts during their further feed-in movement. At the standstill of the manufacturing device, the friction rollers must employ tensing forces on both sides of the tensioned section. These tensing forces correspond to the total of the individual cable forces or the total tension in the belt section which at the exit side is already in finish-vulcanized condition. It is possible to considerably reduce the friction resistances by supporting the belt and the raw belt. Such support can be provided in conformity with heretofore known suggestions by rollers or by endless conveyor belts moving together with the belt to be manufactured through the vulcanizing press. The circulation of the reinforcing inserts as well as that of the finished belt under relatively high pulling tension and with repeated change in direction around the friction rollers is associated with considerable motion resistances. To this must be added as an additional outer interfering factor the pulling force which is required for withdrawing the reinforcing inserts from the supply reels of the preceding reel frame. The present invention practically prevents these additional forces from entering the tensioning section and thus assures the maintainance of uniform tensioning values in the reinforcing inserts during their standstill as well as during their movement. The otherwise interfering factors impede the transporting movement and would necessarily have to be overcome by increasing the pulling force of the friction rollers at the exit region. These interfering factors are eliminated by the additional driving output at the feed-in region for the inserts, so that independently of the condition of movement, always about uniform tensioning conditions will prevail. The uniform movement of both roller systems in this way will not be affected. The substantially homogeneous web of uniformly preloaded reinforcing inserts is so to speak pushed through the device. This surprising effect explains the particular advantages realized by the present invention.

Referring now to the drawing in detail which, for purposes of simplicity, only illustrates those elements which are necessary for understanding the invention. Such detail comprises substantially two stationarily installed friction roller sets. Of these roller sets, the first roller set comprises three rollers 1, 2, 3 which are directly behind the reel frame I forming the head part of the device. The other roller set comprises three rollers 11, 12, 13, in the exit region of the device, for instance between a non-illustrated vulcanizing press and a likewise not illustrated winding-up station for the finished belt; the reinforcing inserts in the form of steel cables 4 are withdrawn from the reels 5 of the frame I. These inserts are then passed around a portion of the circumference of the friction rollers 1, 2, 3 and continue in the direction of the arrow II toward the building-up device proper generally designated III. Here, in a manner known per se, they are covered in successive operations with cover layers and are passed through a vulcanizing press. The finished vulcanized conveyor belt 14 leaves the device over friction rollers 11, 12, 13 and subsequently can be wound onto storage drums.

The two roller sets 1, 2, 3 and 11, 12, 13 define a tension field which includes the building-up device III. The steel cables 4 when passing over the friction rollers 1, 2, 3 are subjected to the tension field within the inlet region. This tension field they leave only when the finished belt 14 rolls off from the friction rollers 11, 12 13. The friction rollers are driven at uniform speed by electric or hydraulic motors. This fact has been indicated in the drawing by showing a common drive motor 6 with branches 16. The type of power transmission and also the number of the friction rollers and their arrangement are of secondary importance for the invention and may be changed to differ from the particular illustrated example. For the sake of clarity, the customary devices for independently tensioning the individual steel cables 4 have been omitted. The friction rollers in their entirety form a dynamic tensioning system (arrows III — III) and to this end are subjected to driving forces in the direction of the heavy vector arrows 7. For a further transportation of the steel cable web 4 or of the finished conveyor belt section 14, the torque exerted by the friction rollers 1, 2, 3 in the inlet or feed-in region is influenced in the sense of a thrust effect upon the steel cables 4 by correspondingly controlling the driving system. The condition of movement of the friction rollers 1, 2, 3 is therefore symbolized by shorter vector arrows 17 which are indicated in dash lines and are pointing in a direction counter to the direction of the vector arrows 7.

It is, of course, to be understood that the present invention is, by no means, limited to the particular showing in the drawing, but also comprises any modifications within the scope of the appended claims.

What we claim is:

1. In combination with a device for making conveyor belts with reinforcing inserts of strands of wire, including an inlet range and an outlet range, first friction roller means arranged at said inlet range, second friction roller means arranged at said outlet range, means for synchronously driving said first and second friction roller means for conveying the reinforcing inserts from said inlet range to said outlet range while subjecting said reinforcing inserts to pull stresses, means for exerting the improvement therewith which comprises directly upon said first friction roller means a torque always entirely effective in a direction opposite to the direction in which said pull stresses act, and being operable to drive said friction roller means at said inlet range with a torque overcoming the total resistance encountered by the reinforcing inserts during their movement from said inlet range to said outlet range.

* * * * *